A. E. DIETERICH.
TRIMMING MECHANISM FOR PASTRY MAKING MACHINES.
APPLICATION FILED OCT. 17, 1916.
1,216,292.
Patented Feb. 20, 1917.
3 SHEETS—SHEET 1.
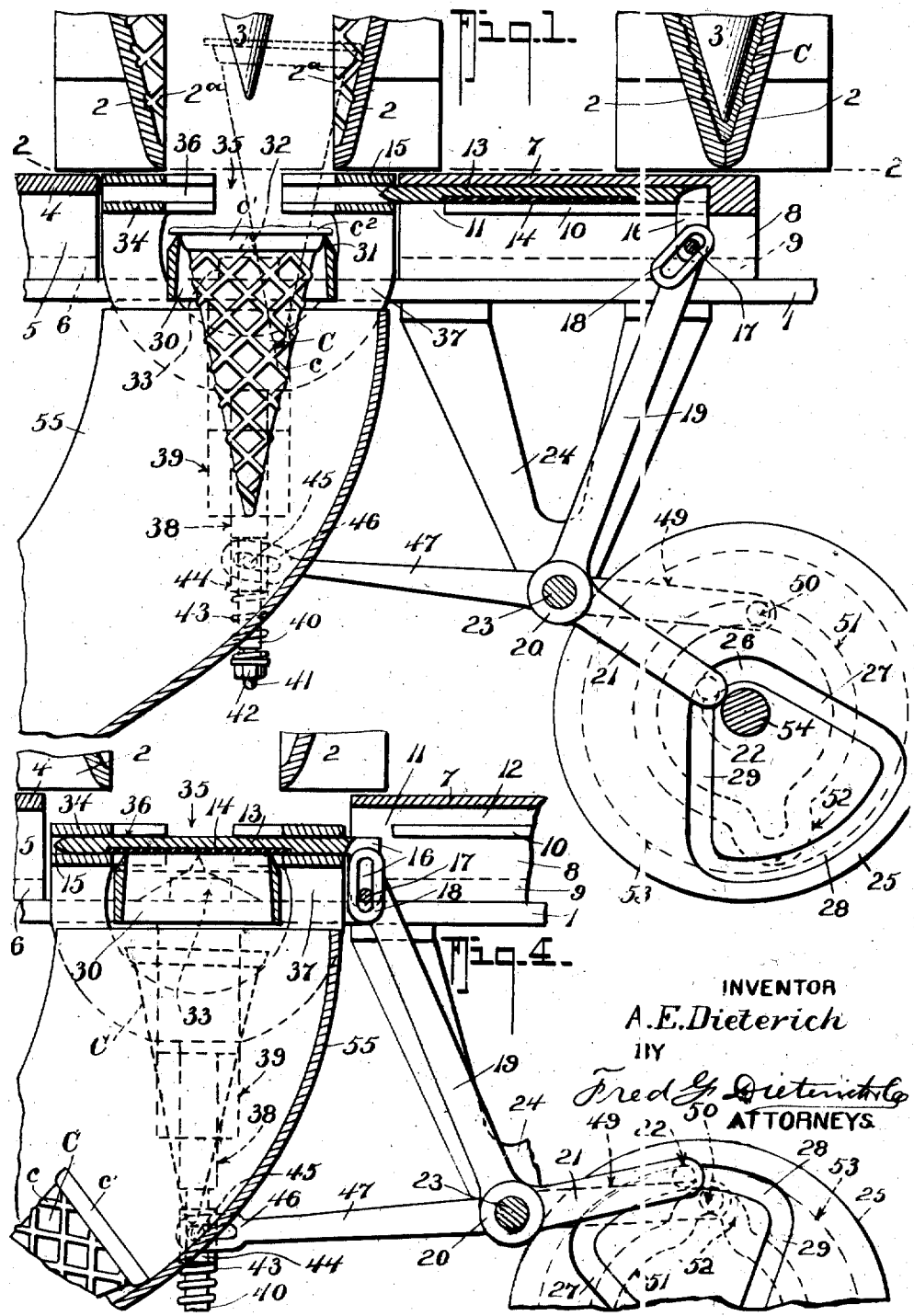
INVENTOR
A. E. Dieterich
BY
Fred G. Dieterich Co.
ATTORNEYS

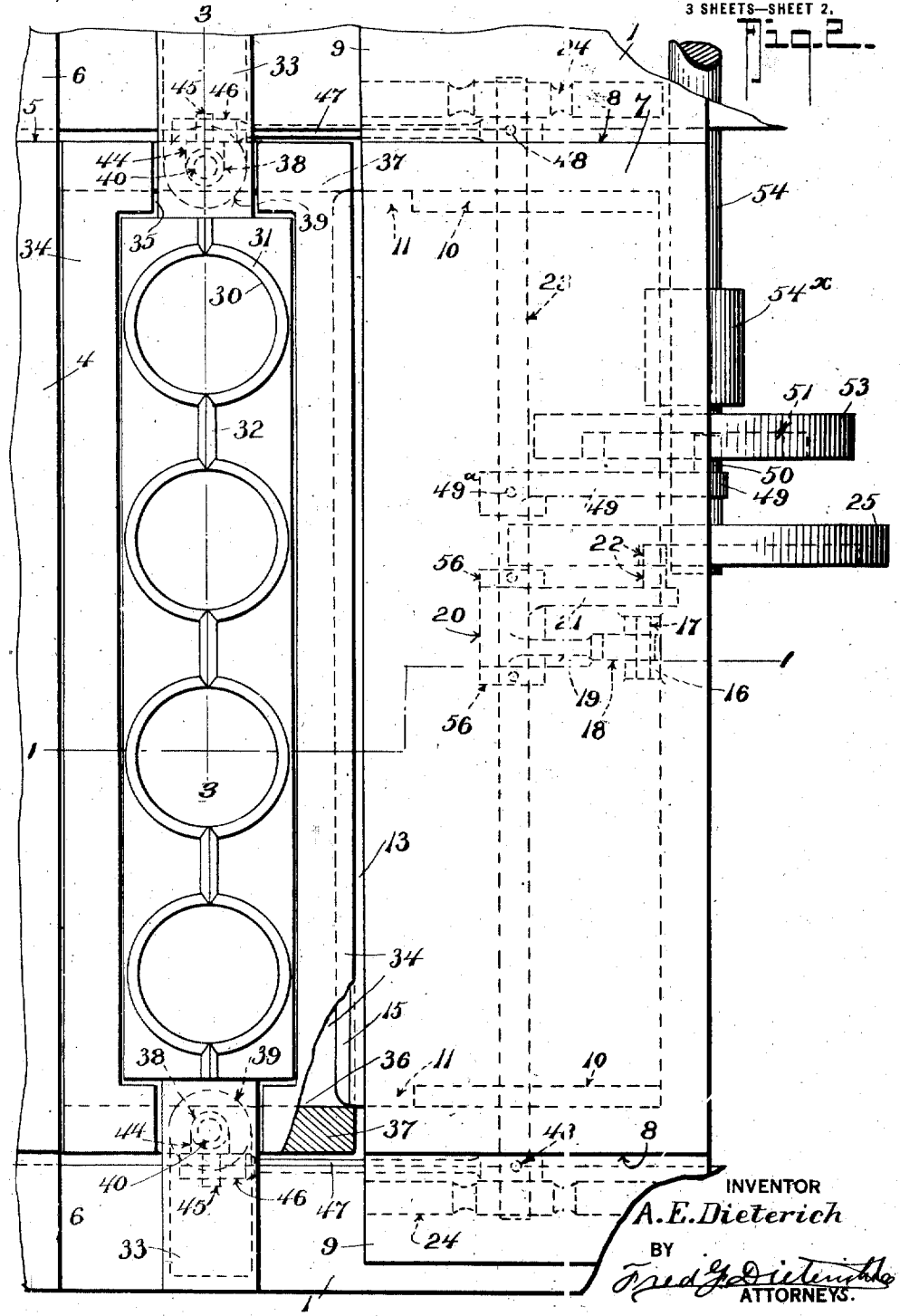

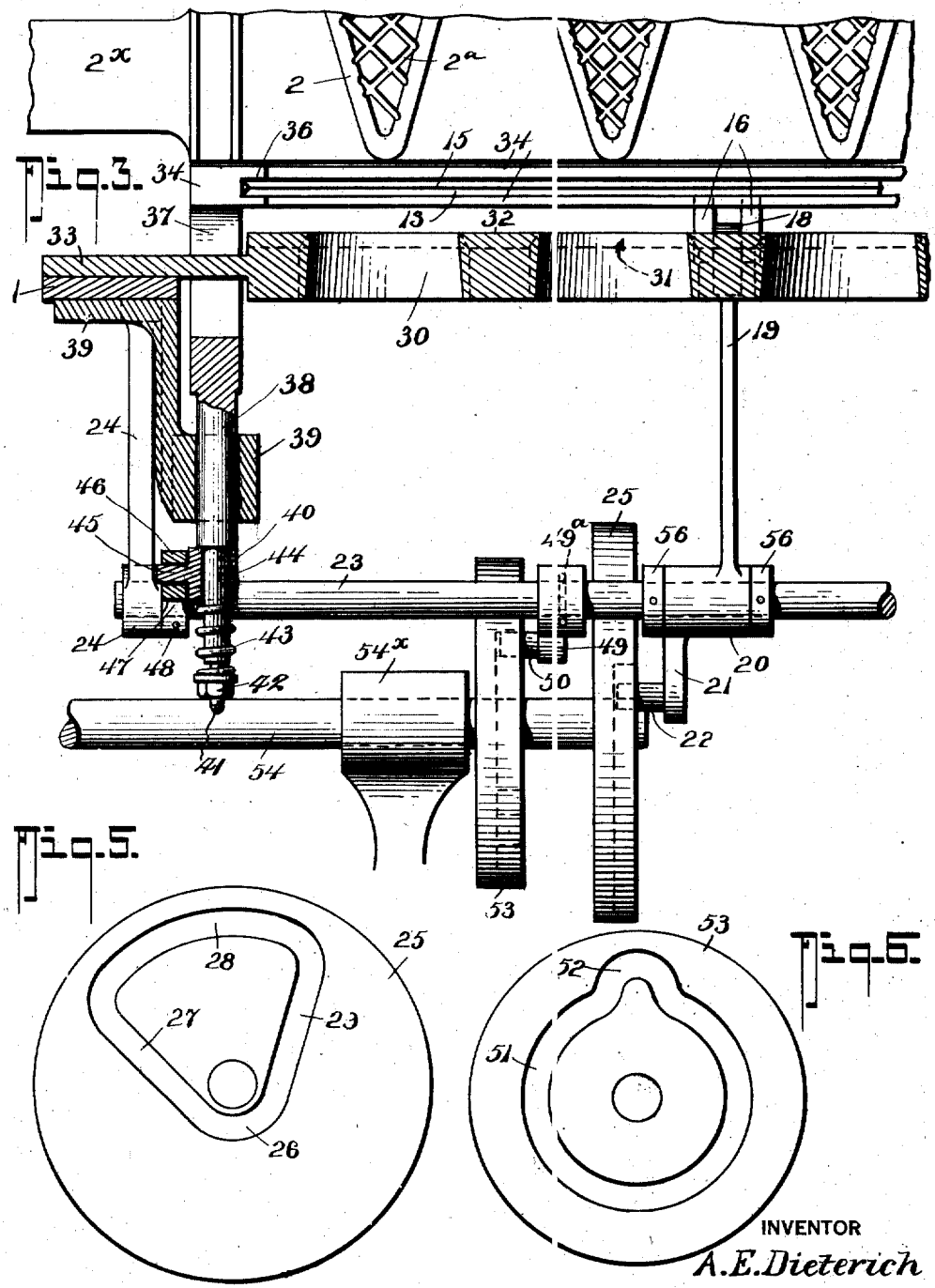

UNITED STATES PATENT OFFICE.

ALBERT E. DIETERICH, OF WASHINGTON, DISTRICT OF COLUMBIA, ASSIGNOR TO FREDERICK A. BRUCKMAN, OF PORTLAND, OREGON.

TRIMMING MECHANISM FOR PASTRY-MAKING MACHINES.

1,216,292.  Specification of Letters Patent.  Patented Feb. 20, 1917.

Application filed October 17, 1916. Serial No. 126,095.

*To all whom it may concern:*

Be it known that I, ALBERT E. DIETERICH, residing at Washington, in the District of Columbia, have invented certain new and useful Improvements in Trimming Mechanism for Pastry-Making Machines, of which the following is a specification.

During recent years there has come into extensive use an ingenious automatic machine for the sanitary, uniform, and practical manufacture of cup pastry, especially ice cream cones. This machine is known to the trade as the "Bruckman automatic cone machine" and is disclosed in Letters Patents 1,071,027, granted August 26, 1913; 1,075,625, granted October 14, 1913; 1,091,729, granted March 31, 1914; 1,091,730, granted March 31, 1914; 1,119,239, granted December 1, 1914 and 1,138,450, granted May 4, 1915 to Frederick A. Bruckman. The Bruckman machine embodies, essentially, sectional female molds adapted to open and close, cores for the same, a batter tank, a means for transferring the batter from the tank to the molds, means for baking the batter in the molds, devices for extracting the molded product from the molds by the proper manipulation of the mold opening and closing devices, and mechanism for trimming off the surplus batter (known as "heads") before delivering the finished article from the machine. In extracting the cone from the molds, the cores or mold members are first slightly lifted in the female molds to loosen the cores from the cones and thereafter the female mold parts are separated thereby permitting the cones to be detached by the core (which acts as a finger for stripping the cones from the male members) whereupon the cones drop onto a chute by which they are conveyed to the trimming mechanism. The trimming mechanism of the Bruckman machines comprises fixed tubular knives into which the cones are shot, and pivoted pushers that shove the cones through the tubes, thus severing the excess batter or "heads" from the cones.

In baking cones in molds there is always an excess of batter, made necessary in order to obtain a perfect cone, and this excess of batter presses out at the top of the molds and forms a rough annular ring at the top of the cone. This ring is known as a "head" and is removed before the cone is completed as a salable article. The trimming mechanism of the Bruckman machine is provided for the purpose of cutting off this excess batter or "head."

Experience has shown that in chuting the cones from the molds to the trimmer tubes the cones do not always enter the tubes properly but occasionally twist in the chute or hang up in transit, sometimes entering the trimmer tubes and catching before the cone has dropped into the tube up to the head. This makes it desirable to have an attendant with the machine, who, by the use of a flat stick or paddle, taps the occasional cone down into place in the trimmer tube before the pusher operates on the same. It is to overcome these features and to make the entry of each cone into the respective trimming tube positive, that I have provided the mechanism herein shown and described and which constitutes the subject-matter of the present invention.

Generically, my invention consists in locating the trimming tubes with their entrances as close as possible to the outlets or bottom of the female molds whereby the cones may commence entering the trimming tubes before they have finally departed from the mold cavities, thus insuring the proper centering of each cone in its respective trimming tube or ring, regardless of whether the "head" of the cone is detached from a "head" of an adjacent cone, thus making it unnecessary to keep the batter for each individual cone, in the plural molds, separated in baking.

Other objects of my invention are to accomplish the trimming act with the use of stationary trimming tubes, such as employed in the Bruckman machine at present, and thus enable the trimmed cones to be delivered into a fixed offtake chute by which they are shot onto the conveyer that takes them to the stacking device; to utilize the generic idea of the Bruckman trimmer namely,— a movable or reciprocable pusher to push the cones through stationary cutting tubes; to enable the same general construction of trimming tubes to be employed, as in the Bruckman machine at present, whereby the head rings are broken up so that the trimmer tubes are self-clearing. In order to accomplish these objects, I provide a reciprocating pusher frame operated in time with the other mechanism of the machine, through a camming action, from a suitable rotative part of the machine, and a push plate or bar with means for introducing it to and withdrawing it from the pusher frame at intervals by what I term a "shuttle motion," camming mechanism being provided to effect the said motion of the push plate or bar at the proper times.

The invention also resides in providing means for insuring the positive positioning of the parts at all times.

In its more subordinate features, my invention includes those novel details of construction, combination and arrangement of parts, all of which will be first fully described, then be specifically pointed out in the appended claims, and illustrated in the accompanying drawings, in which:—

Figure 1 is a vertical section on the line 1—1 of Fig. 2.

Fig. 2 is a horizontal section on the line 2—2 of Fig. 1.

Fig. 3 is a vertical cross section on the line 3—3 of Fig. 2.

Fig. 4 is a detail view similar to Fig. 1 showing the parts just after the cone has been trimmed and pushed through the trimmer knives or tubes.

Fig. 5 is a detail elevation of the shuttle motion cam.

Fig. 6 is an elevation of the cam that reciprocates the pusher frame.

In the drawings I have indicated only a portion of the molding devices of the Bruckman machine, and in order to understand fully the construction and operation of such molding devices reference should be made to the Bruckman patents hereinbefore referred to, particularly Patent #1,071,027 and Patent #1,138,450. I have indicated in Fig. 1 of the accompanying drawings of the present application, the molding devices at the extraction station and the loading station respectively (see Fig. 1 of the accompanying drawings) it being understood that the molding devices are operated with the same operating and camming mechanism shown in the Bruckman patent referred to.

In the accompanying drawings, in which like letters and numerals of reference indicate like parts in all of the figures, 1 represents the annular ring bars of the frame of the machine, and 2 designates the female mold section, while 3 indicates the cores that coöperate with the same.

C designates the molded product (in this case, the cone, although it should be understood that the machine may be adapted for molding any kind of a cup-like wafer article).

When the machine is one in which the molds begin to open before the extraction station is reached, it is preferable to provide a stop plate 4 having side standards 5 and feet 6 secured to the bars with the stop plate located close up under the molds 2, so that the cone will not begin to drop until the extraction station has been reached. In machines, however, in which the complete opening and closing act occurs at the extraction station (and this is possible by the employment of mechanism for imparting parallel motion to the female mold sections) the plate 4 will not be necessary.

7 represents the push plate holder or support which is located to one side of the extraction station (either side, or front and back of the said station, as may be found convenient). The holder 7 has a slideway 12 formed by the projecting webs 10 and the holder is supported from the bars by feet 9 and standards 8, as best shown in Figs. 1, 2 and 4 of the drawing. The webs 10 terminate short of the front end of the holder 7 to leave a clearance space 11 to permit the push plate to be raised up and down by the pusher frame, as will be more clearly understood later.

The push plate 13 normally lies in the holder 7, as indicated in Fig. 1, and it may be provided with a resilient pad 14, or if desired, the push plate may have a tubular portion with yielding ring construction, but inasmuch as I claim no invention on this particular feature I have, for purposes of illustration, shown a conventional yielding pad 14 of semi-soft rubber for the purpose.

The front end of the push plate 13 is preferably beveled to afford easy entrance into the guideways 36 of the pusher frame and when the push plate 13 is retracted into the holder 7, its front end will preferably also project slightly into the adjacent guideway of the pusher frame to insure positive alinement between the pusher frame guideways and the holder guideways during the time the push plate is retracted.

The push plate is provided with ears 16 between which is a pin 17 that works in an elongated slot 18 in the end of the long arm 19 of a bell crank lever, the short arm 21, of which has a pin 22 to coöperatively engage the camming slot of the cam 25. The lever 19 has its bearing hub 20 mounted loosely on the rock shaft 23, the shaft 23 being journaled in suitable pendent bearing frames 24 secured to the bars 1.

The slot of the cam 25 is provided with a concentric portion 26 of short radius and comparatively long-dwell, the concentric portion 26 merging with the diverging short portions of the camway 27—29 which, in turn, merge with the concentric way 28 of long radius and long-dwell.

30 designates the trimmer tubes of which there is provided one for each mold cavity.

The trimmer tubes 30 have beveled entrances 31 and adjacent entrances are bridged by knives 32 that divide the cut off "heads" into parts and permit the same to fall down into the chute 55 with the cones, the separation of the cones and the trimmings being effected in a suitable stacking mechanism (not shown). The trimmer tubes are supported by extensions 33 that are secured in any suitable way to the bars 1.

The pusher frame consists of side yoke members 37 united by transverse bars 34 that are spaced apart to form the guideways 36, the bars 34 may be separated as at 35 to clear the supports 33 of the trimmer tubes, if necessary. The members 37 have spindles 38 which reciprocate in the hanger bearings 39 that are pendent from the bars 1, the spindles 38 having reduced portions 40 on which the collars 44 are held against the spindle shoulder by a stout buffer spring 43, the tension of which may be adjusted by the nut 42 on the threaded extension 41 of the spindle.

The collars 44 have pins 45 which work in the slotted ends 46 of the levers 47, the levers 47 being pinned at 48 to the rock shaft 23 (it being understood that there is one lever 47, at each side, see Fig. 2). Pinned at 49ª to the rock shaft 23, is a lever 49, whose finger 50 enters the cam slot 51—52 of the cam 53, the cam slot having a long-dwell circular portion 51 with a quick-throw portion 52 so positioned with relation to the long-dwell portion 28 of the cam 25 that the cam 53 will perform its entire reciprocating function during the time the finger 22 of the lever 21 is within the confines of the long-dwell concentric portion 28 of the slot of the cam 25 (see Fig. 4).

54 is the cam shaft which is mounted in a bearing 54ˣ and carries the cams 53 and 25 respectively, the shaft 54 receiving its motion from any rotative part of the machine through suitable gearing (not shown) as may be found desirable.

55 is the chute onto which the trimmed cones are dropped and shot to the offtake conveyer of the stacking mechanism.

It will be noticed that the female molds are provided with grooves 2ª that form the decorative beads c on the cones C, the cones C being provided with smooth mouths c' on which the "heads" c² are formed in baking and it is the heads c² that it is the purpose of the trimming mechanism to remove.

In the operation of the invention when the mold arrives at the extraction station and opens up, as shown at the left of Fig. 1, the cone will drop into the trimmer tube, as shown in full lines in Fig. 1. Should the drop be straight down with the ends of the cone in alinement with the ends of the core 3, no difficulty will be encountered in the cone centering and resting as shown in full lines in Fig. 1, and by reason of the fact that the trimmer tubes 31 are located relatively close to the molds, even though the cone should move to one side, (see dotted lines, Fig. 1) it will still drop properly into the trimmer tubes, by reason of the fact that the coöperation of the core 3 and the walls of the molds 2 will, as the cone drops, tend to center the cone again and permit it to properly fall into the trimmer tube.

In practice, a space should be left between the upper edges of the trimmer tubes and the plane of the push bar 13 to allow for various thicknesses of heads and the possible slight hanging up of the cone in the tube so that when the push bar is introduced into the pusher frame it will not engage the cone to break it.

After the cone has dropped into the trimmer tube, as shown in Fig. 1, and the cam slot portion 27 has come into register with the finger 22, the bell crank lever 19—21 will rock from the position shown in Fig 1 to the position shown in Fig. 4, at which time the finger 22 will have entered the long-dwell concentric portion 28 of the cam slot and the lever 19 will be held "locked" in the position shown in Fig. 4 for a definite interval of time during which the quick-throw portion 52 of the camway 51 will have received the finger 50 and rock the lever 47 to the position shown in Fig. 4 to bring the push plate down on the cone in the trimmer tube and push it through the same, the cone following as shown in dotted lines in Fig. 4 into the chute 55 (see full lines in Fig. 4) by which it is shot to the offtake conveyer.

The concentric portion 28 of the groove of the cam 25 is of such length that the quick-throw portion 52 of the groove of the cam 53 can perform its complete function while finger 22 remains in the portion 28, so that the pusher frame will be restored to its normal position (see Fig. 1) before the finger 22 enters the returnway 29 of the cam 25. As soon as the finger 22 enters the returnway 29 the lever 19—21 is quickly rocked back to the position shown in Fig. 1 to return the push plate into the holder 7, whereupon the parts will be ready for the next cones to come down.

In the drawings I have shown a preferred way of operating the parts and a preferred coöperation of the same, but I desire it understood that numerous changes in the mechanical details and arrangement of parts can be made and will, of necessity, have to be made, in order to adapt the invention to other types of machines than the Bruckman machine, and I do not desire to be understood as limiting the invention beyond the fair interpretation and scope of the appended claims and beyond what may be required by the state of the prior art.

From the foregoing description taken in connection with the accompanying drawings, it is thought the complete construction, operation and advantages of this invention will be readily understood by those skilled in the art to which it appertains.

What I claim is:

1. In combination with the molding devices, of trimmer tubes located beneath the same at the extraction station to directly receive the cones as they are released from the molds, a pusher frame, a push plate, camming devices for actuating the pusher frame and camming devices for introducing said push plate into and withdrawing the same from said pusher frame.

2. In combination with the molding devices, of trimmer tubes located beneath the same and adapted to receive the molded product from the molding devices, a pusher frame, a push plate, camming devices for bringing the push plate into operative engagement with the pusher frame and reciprocating the pusher frame to push the molded product through the trimmer tubes.

3. In combination with the molding devices, of a trimmer tube located beneath the same at the extraction station to receive the molded product released from the molding devices, a push plate, means for projecting said push plate between said molding devices and said trimmer tubes, and means for moving said push plate toward said trimmer tubes to force the molded product through the same.

4. In combination with the separable female mold sections and cores therefor and the mold-actuating-cone-extracting mechanism, of a relatively fixed trimmer tube located at the extraction station in close proximity to the bottom of the molds to directly receive the molded product as it is released from the molds, and devices for forcing the molded product through the tube.

5. In combination with the separable female mold sections and cores therefor and the mold-actuating-cone-extracting mechanism, of a relatively fixed trimmer tube located at the extraction station in close proximity to the bottom of the molds to directly receive the molded product as it is released from the molds, and a pusher for forcing the molded product through the trimmer tube.

6. In combination with the separable female mold sections and cores therefor and the mold-actuating-cone-extracting mechanism, of a relatively fixed trimmer tube located at the extraction station in close proximity to the bottom of the molds to directly receive the molded product as it is released from the molds, a pusher for forcing the molded product through the trimmer tube, said pusher including a push-plate, and camming mechanism for actuating the same.

7. In combination with the separable female mold sections and cores therefor and the mold-actuating-cone-extracting mechanism, of a trimmer tube located at the extraction station in close proximity to the bottom of the molds to receive the molded product as it is released from the molds, a pusher for forcing the molded product through the trimmer tube, said pusher including a push plate, a support for said plate located to one side of the extraction station, and mechanism for projecting the plate over the trimmer tube and forcing it down to push the molded product through the tube.

8. In combination with the separable female mold sections and cores therefor and the mold-actuating-cone-extracting mechanism, of a trimmer tube located at the extraction station in close proximity to the bottom of the molds to receive the molded product as it is released from the molds, a pusher for forcing the molded product through the trimmer tube, said pusher including a push plate, a support for said plate located to one side of the extraction station, a pusher frame, mechanism for reciprocating said frame, and means for imparting a shuttle motion to said plate to introduce it to and withdraw it from said frame.

9. In combination with the separable female mold sections and cores therefor and the mold-actuating-cone-extracting mechanism, of a trimmer tube located at the extraction station in close proximity to the bottom of the molds to receive the molded product as it is released from the molds, a pusher for forcing the molded product through the trimmer tube, said pusher including a push plate, a support for said plate located to one side of the extraction station, a pusher frame, camming devices for actuating said frame, said frame projecting above the top of said trimmer tube and having plate receiving guides, and camming devices for actuating said push plate to introduce it to and withdraw it from said frame guides.

10. In combination with the separable female mold sections and cores therefor and the mold-actuating-cone-extracting mechanism, of a trimmer tube located at the extraction station in close proximity to the bottom of the molds to receive the molded product as it is released from the molds, a pusher for forcing the molded product through the trimmer tube, said pusher including a push plate, a support for said plate located to one side of the extraction station, a pusher frame, camming devices for actuating said frame, said frame projecting above the top of said trimmer tube and having plate receiving guides, camming devices for actuating said push plate to introduce it to and withdraw it from said frame guides, and means for maintaining the alinement of said support and pusher frame guides when said plate is retracted.

11. A trimming mechanism for pastry making machines comprising stationary trimmer tubes, a pusher frame vertically reciprocable with relation to said tubes, pusher plate guides carried by said frame, a push plate holder located to one side of said frame, a push plate adapted to coöperate with said holder and said frame, said push plate lying normally in said holder and camming devices for moving said plate into said frame guides and reciprocating said frame.

12. In combination with the molding devices which include laterally separable female mold sections and a vertically liftable core, of a trimming mechanism including a trimming tube located with its entrance in close proximity to said molding devices at the discharge or extraction station, whereby when said molding devices are opened, the molded product will begin entering said trimmer tube before moving out of the influence of said female mold sections and said core, a reciprocating pusher frame including guides located in a plane between said trimmer tube and said molding devices and having a passageway through which the molded product drops into the trimmer tube, a push plate holder located to one side of said frame, a reciprocating push plate coöperative with said holder and said frame, and camming devices for effecting the reciprocating movements of said push plate and of said frame.

13. In combination with the molding devices which include laterally separable female mold sections and a vertically liftable core, of a trimming mechanism including a trimming tube located with its entrance in close proximity to said molding devices at the discharge or extraction station, whereby when said molding devices are opened the molded product will begin entering said trimmer tube before moving out of the influence of said female mold sections and said core, a reciprocating pusher frame including guides located in a plane between said trimmer tube and said molding devices and having a passageway through which the molded product drops into the trimmer tube, a push plate holder located to one side of said frame, a reciprocating push plate coöperative with said holder and said frame, camming devices for effecting the reciprocating movements of said push plate and of said frame, said push plate while in said holder adapted to project into engagement with a portion of said frame to maintain alinement between the frame and holder.

14. In combination with the molding devices which include laterally separable female mold sections and a vertically liftable core, of a trimming mechanism including a trimming tube located with its entrance in close proximity to said molding devices at the discharge or extraction station, whereby when said molding devices are opened, the molded product will begin entering said trimmer tube before moving out of the influence of said female mold sections and said core, a reciprocating pusher frame including guides located in a plane between said trimmer tube and said molding devices and having a passageway through which the molded product drops into the trimmer tube, a push plate holder located to one side of said frame, a reciprocating push plate coöperative with said holder and said frame, camming devices for effecting the reciprocating movements of said push plate and of said frame, said camming devices including an actuating lever for said push plate, an actuating lever for said pusher frame, and quick-throw cams having long dwells at their extremes of action, whereby said push plate will be introduced into said pusher frame and held there while said pusher frame is reciprocated through its cycle and whereby said pusher frame will be held immovable while said push plate is reciprocated through its cycle.

15. In a trimming mechanism of the class described, trimmer tubes, a pusher frame, a push plate, devices for actuating the pusher frame, and devices for bringing the push plate into coöperative relation with the pusher frame and trimmer tubes at intervals.

16. A trimming mechanism comprising trimmer tubes adapted to receive the article to be trimmed, a pusher frame projected above the tubes and having openings through which the article to be trimmed is adapted to pass, a push plate, camming devices for bringing the push plate into position above the trimmer tube to be engaged by the pusher frame, and camming devices for operating the pusher frame.

17. A trimming mechanism comprising a trimmer tube, a reciprocating pusher frame having a passage through which the article to be trimmed is adapted to pass to the tube, said pusher frame having guideways, a push plate, camming mechanism for imparting shuttle motion to said push plate to bring it into operative position with relation to said pusher frame and said tube, and camming mechanism for actuating said pusher frame.

18. A trimming mechanism including a trimmer tube, a pusher for forcing the molded product through the trimmer tube, said pusher including a push plate, a support for said plate, a pusher frame, mechanism for reciprocating said frame, and mechanism for imparting shuttle motion to said plate to introduce it to and withdraw it from coöperative relation with said pusher frame and said trimmer tube.

19. In combination with the separable female mold sections and cores therefor and the mold-actuating-cone-extracting mechanism, of a trimmer tube permanently located at the extraction station in proximity to the bottom of the molds to receive the molded product as it is released from the molds, said female mold sections serving to act as guides for the cones in entering the trimmer tube, and devices for forcing the molded product through the tube.

20. In combination with the separable female mold sections, the cores therefor and the mold-actuating-cone-extracting mechanism, of a stationary trimmer tube located at the extraction station in close proximity to the bottom of the molds to directly receive the molded product as it is released from the molds, the female mold sections acting as guides for the cones in entering the trimmer tube, the position of said trimmer tube with relation to the female mold sections being such that the cones enter the tube before the cones are fully discharged from the mold sections.

ALBERT E. DIETERICH.